United States Patent [19]

Dixon et al.

[11] Patent Number: 5,158,430
[45] Date of Patent: Oct. 27, 1992

[54] SEGMENTED STATOR VANE SEAL

[75] Inventors: William E. Dixon, Jensen Beach; Joseph C. Burge, Palm Beach Gardens; Richard J. Tiernan, Jr., Hobe Sound; Lee E. Hensen, Lake Park, all of Fla.

[73] Assignee: United Technologies Corporation, Hartford, Conn.

[21] Appl. No.: 785,901

[22] Filed: Nov. 1, 1991

Related U.S. Application Data

[63] Continuation of Ser. No. 581,229, Sep. 12, 1990, abandoned.

[51] Int. Cl.[5] .......................................... F01D 25/24
[52] U.S. Cl. .................................... 415/134; 415/139
[58] Field of Search .............. 415/134, 135, 136, 137, 415/138, 139, 115

[56] References Cited

U.S. PATENT DOCUMENTS

| | | | |
|---|---|---|---|
| 2,863,634 | 12/1958 | Chamberlin et al. | 415/136 |
| 3,752,598 | 8/1973 | Bowers et al. | 415/115 |
| 3,892,497 | 7/1975 | Gunderlock et al. | 415/134 |
| 4,337,016 | 6/1982 | Chaplin | 415/138 |
| 4,537,024 | 8/1985 | Grosjean | 415/139 |
| 4,714,404 | 12/1987 | Lardellier | 415/173.2 |
| 4,902,198 | 2/1990 | North | 415/115 |

*Primary Examiner*—John T. Kwon
*Attorney, Agent, or Firm*—Norman Friedland

[57] ABSTRACT

A "dog bone" in cross section shaped seal mounted in adjacent grooves of segmented stator vanes span the axial extent covering a single casted three rows of vanes. The outer diameter shroud of the stator vane defines a portion of an enclosed cavity subjected to leakage flow in and out of the gas path where the flow reverses at some axial extent of the seal such that the forces acting at different locations on the seal reverses. In a preferred embodiment, the bulbous ends of the "dog bone" are solid coated metallic material.

5 Claims, 3 Drawing Sheets

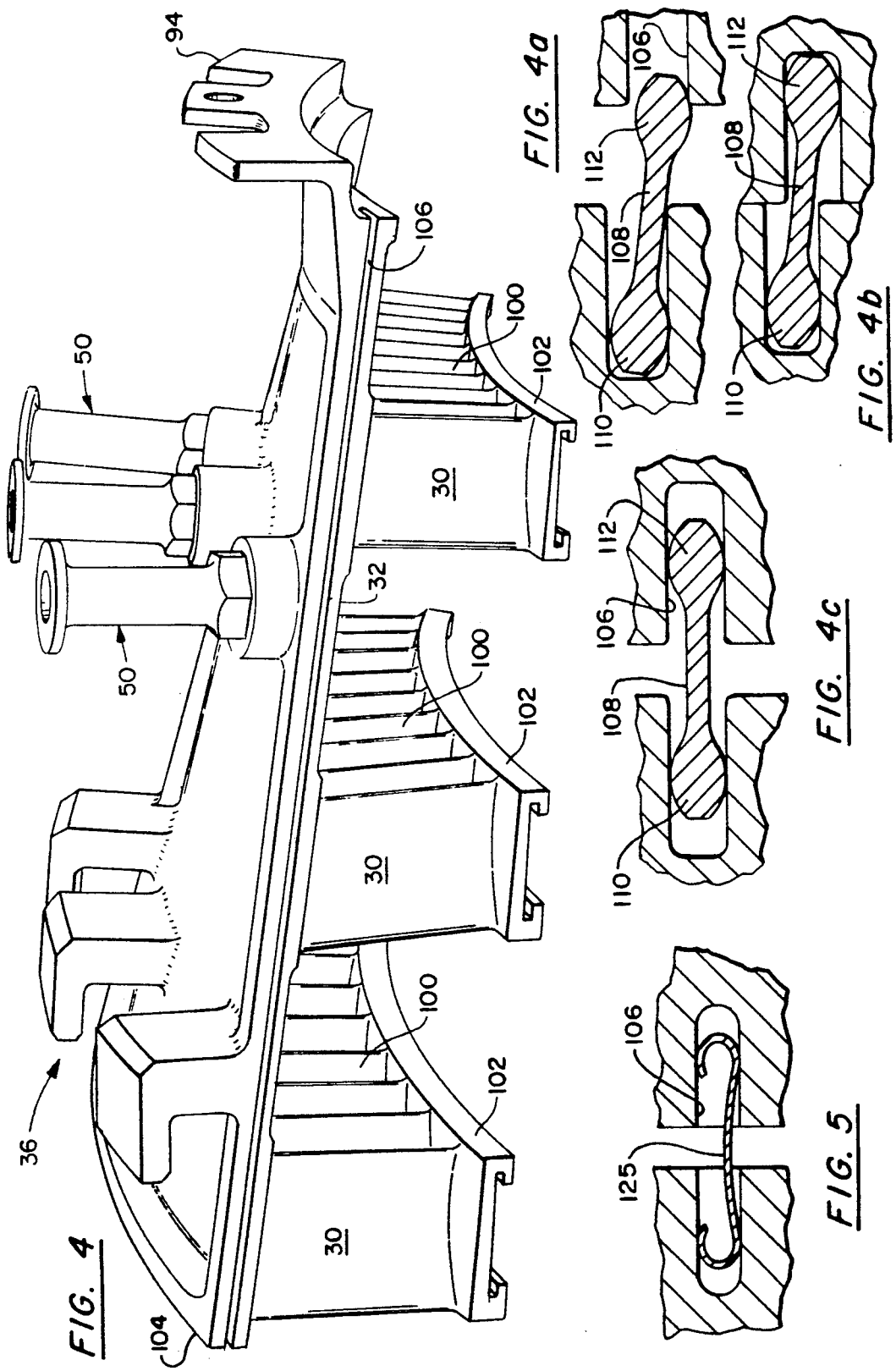

SEGMENTED STATOR VANE SEAL

The invention was made under a U.S. Government contract and the Government has rights herein.

This is a continuation of application Ser. No. 07/581,229 filed on Sep. 12, 1990, now abandoned.

DESCRIPTION

CROSS REFERENCE

The subject matter of this application is related to the subject matter of the following commonly assigned patent applications: U.S. application Ser. No. 581,223 entitled "Fastener For Multi-State Compressor"; U.S. application Ser. No. 581,224 entitled "Fastener Mounting For Multi-Stage Compressor"; U.S. application Ser. No. 581,231 entitled "Case Typing Means For A Gas Turbine Engine"; U.S. application Ser. No. 581,230 entitled "Compressor Bleed"; U.S. application Ser. No. 581,228 entitled "Backbone Support Structure For Compressor"; U.S. application Ser. No. 581,227 entitled "Compressor Case Construction With Backbone"; U.S. application Ser. No. 581,219 entitled "Compressor Case Construction"; U.S. application Ser. No. 581,240 entitled "Compressor Case Attachment Means"; U.S. application Ser. No. 581,220 entitled "Compressor Case With Controlled Thermal Environment"; all of the above filed on even date herewith.

TECHNICAL FIELD

This invention relates to the compressor section of a gas turbine engine and particularly to the seal between segments of a multiple stator vane configuration.

BACKGROUND ART

As is well known, the compressor case of a gas turbine engine powering aircraft is subjected to severe pressure and temperature loadings throughout the engine operating envelope and care must be taken to assure that the components remain concentric maintaining relatively close running clearances so as to avoid inadvertent rubs. Inasmuch as the engine case is thin relative to the rotor and stator components in the compressor section, it responds more rapidly to temperature changes than do other components. This is particularly true during periods of transient engine performance. Typical of these transients are throttle chops, throttle bursts, and the like. Obviously it is customary to provide sufficient clearances during these transients to assure that the rotating parts do not interfere with the stationary parts.

The problem becomes even more aggravated when the engine case is fabricated in two halves (split case) which is necessitated for certain maintenance and construction reasons. Typically, the halves are joined at flanges by a series of bolts and the flanges compared to the remaining portion of the circumference of the case is relatively thick and hence does not respond to thermal and pressure changes as quickly as the thinner portion of the case. The consequence of this type of construction is that the case has a tendency to grow eccentrically or out of round.

In certain instances in order to attain adequate roundness and concentricity to achieve desired clearance between the rotating and nonrotating parts, it was necessary to utilize a full hoop case for the highest stages of a multiple stage compressor. Since the stator components, i.e., stator vanes and outer air seals, are segmented the problem was to assure that the compressor maintained its surge margin notwithstanding the fact that the outer case would undergo large deflection at acceleration and deceleration modes of operation. The cavity that exists between the outer case and the inner case formed by the segmented stator components, being subjected to pressures occasioned by the flow of engine air through the various leakage paths, presented a unique problem. In the event of a surge, the pressure in the gas path would be reduced significantly. Because the air in the cavity is captured and cannot be immediately relieved, it would create an enormous pressure difference across the stator components, cause them to distort, with a consequential rubbing of the compressor blades, and a possible breakage.

In addition and in the interest of weight reduction, fewer component parts, improved maintainability, certain stages of the compressor section were treated as integral components, such that three rows of stator vanes are included in a single casting of segmented components. Hence, the segmented arcuate castings are assembled end-to-end to define a ring containing the three rows of vanes. Because the axial extent of the three rows of vanes are included within the full hoop casing the pressure acting over the axial distance varies from a pressure differential that is opposite in direction at one end from that on the other end. This created a problem in preventing the leakage of flow from the gas path to the surrounding cavity and vice versa, thus imposing engineering problems in sealing between segments The invention teaches sealing means to solve the problem alluded to in the aforementioned paragraph by utilizing a dog-bone shaped seal that is capable of solving these engineering problems while exhibiting the structural integrity to satisfy the maintainability requirements of the overall engine.

SUMMARY OF THE INVENTION

An object of this invention is to provide an improved seal for multiple rows of unitary segments comprising the stator vanes for multiple compression stages in the compressor section of a gas turbine engine.

A feature of this invention is utilizing a "dog-bone" shaped seal extending axially between segments where the forces acting from one end of the seal to the other end of the seal reverses.

The foregoing and other features and advantages of the present invention will become more apparent from the following description and accompanying drawings.

BRIEF DESCRIPTION OF THE DRAWINGS

FIG. 4 is a perspective view of a segment of the stator vane.

FIG. 4a is a partial view partly in section and partly in elevation showing the details of the seal.

FIG. 4b is a partial view partly in section and partly in elevation showing the details of the seal in one extreme position.

FIG. 4c is a partial view partly in section and partly in elevation showing the details of the seal and another extreme position.

FIG. 5 is an end view of another embodiment of the "dog-bone" shaped seal.

STATEMENT OF THE INVENTION

The foregoing and other features and advantages of the present invention will become more apparent from the following description and accompanying drawings.

BEST MODE FOR CARRYING OUT THE INVENTION

Figure 1:
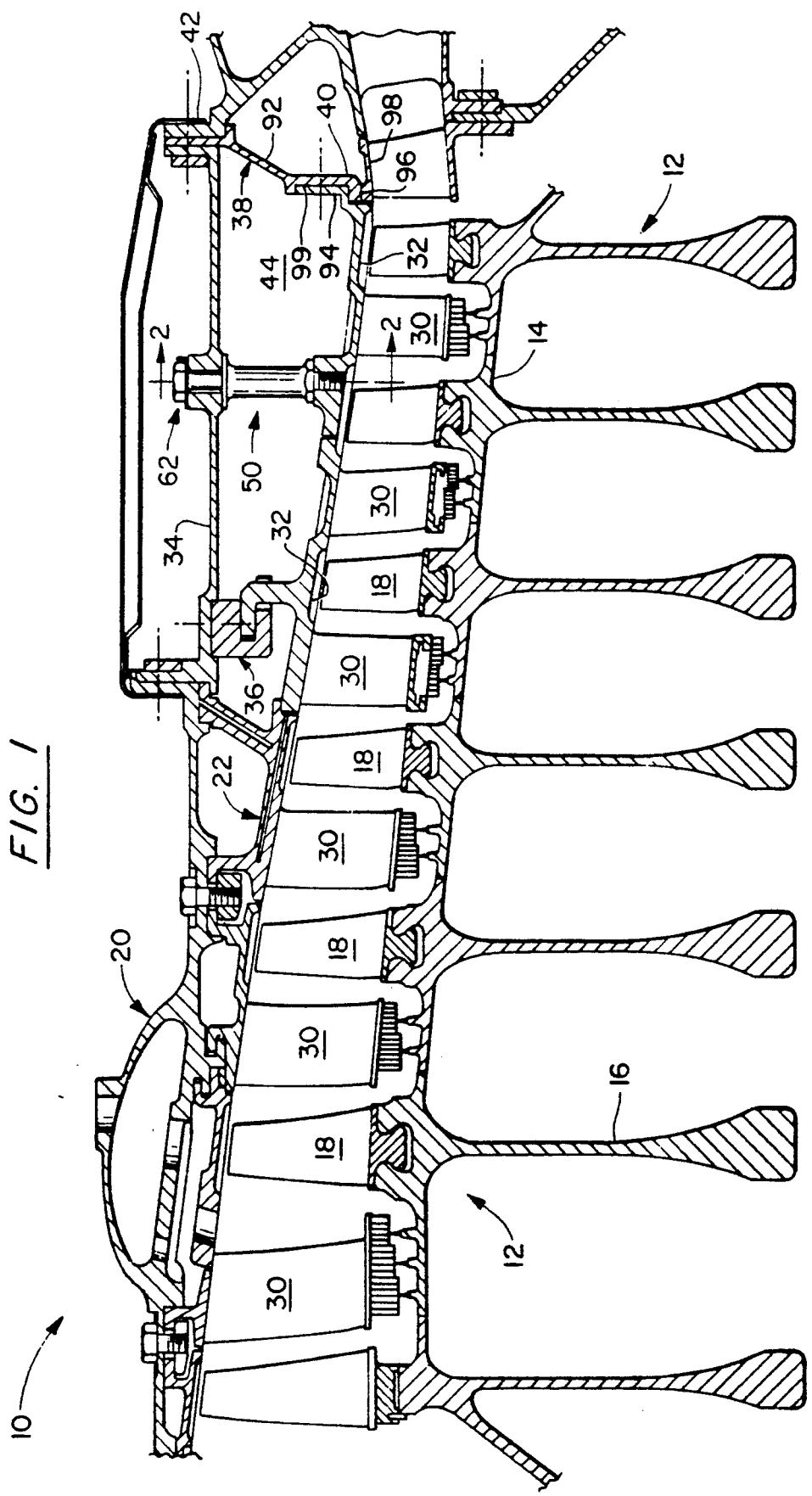
FIG. 1 is a partial view partly in section and partly in elevation of a multi-stage axial flow compressor for a gas turbine engine.
Figure 2:
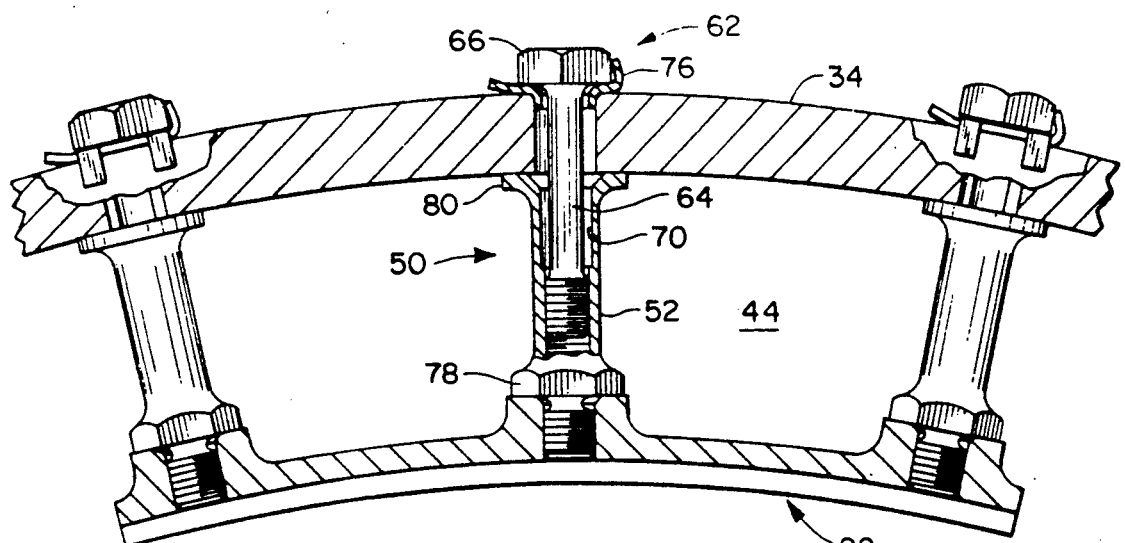
FIG. 2 is a partial sectional view partly in schematic taken along lines 2—2 of FIG. 1 showing one of several segments of the components making up the inner case.

To best understand this invention reference is made to FIGS. 1 and 2 showing part of a multi-stage compressor for a gas turbine engine of the type for powering aircraft. For more details of a gas turbine engine the F100 family of engines manufactured by Pratt & Whitney, a division of United Technologies Corporation, the assignee of this patent application, is incorporated herein by reference. Suffice it to say that in the preferred embodiment the engine on which this invention is being utilized is a fan-jet axial flow compressor multi-spool type. As noted in FIG. 1 the compressor section generally indicated by reference numeral 10 is comprised of a plurality of compressor rotors 12 retained in drum rotor 14, where each rotor includes a disk 16 supporting a plurality of circumferentially spaced compressor blades 18. The rotors 12 are suitably supported in an outer engine case 20 and an inner case 22.

In this configuration a portion of the outer case 20 is fabricated in two axial circumferential halves and the other portion is fabricated in a full hoop generally cylindrically shaped case. In FIG. 1 the first four lower pressure stages as viewed from the left hand side are housed in the split case and the last three stages are housed in the full case.

Inasmuch as this invention pertains to the aft section (full case) of the compressor, for the sake of simplicity and convenience only the portion of the compressor dealing with the full case will be discussed hereinbelow. The inner case 22 which comprises the stator vanes 30 and outer air seal 32 are supported in the full case 34 via the dog-jaw hook connection 36 and the bulkhead 38 which carries suitable attaching flanges 40 and 42.

As was mentioned above the problem associated with this construction is that the cavity 44 between the inner case 22 and outer case 34 is ultimately pressurized by the fluid leaking therein from the engine flow path. The engine flow path is defined by the annular passageway bounded by the inner surface of the inner case 22 and outer surface of drum rotor 14. This pressure can reach levels of 5-600 pounds per square inch (PSI). Should a surge situation occur the pressure level in the gas path can reduce instantaneously to a value much lower than the 5-600 PSI and since the pressure in cavity 44 is trapped and can only be reduced gradually, an enormous pressure differential exists across inner case 22.

Figure 3:
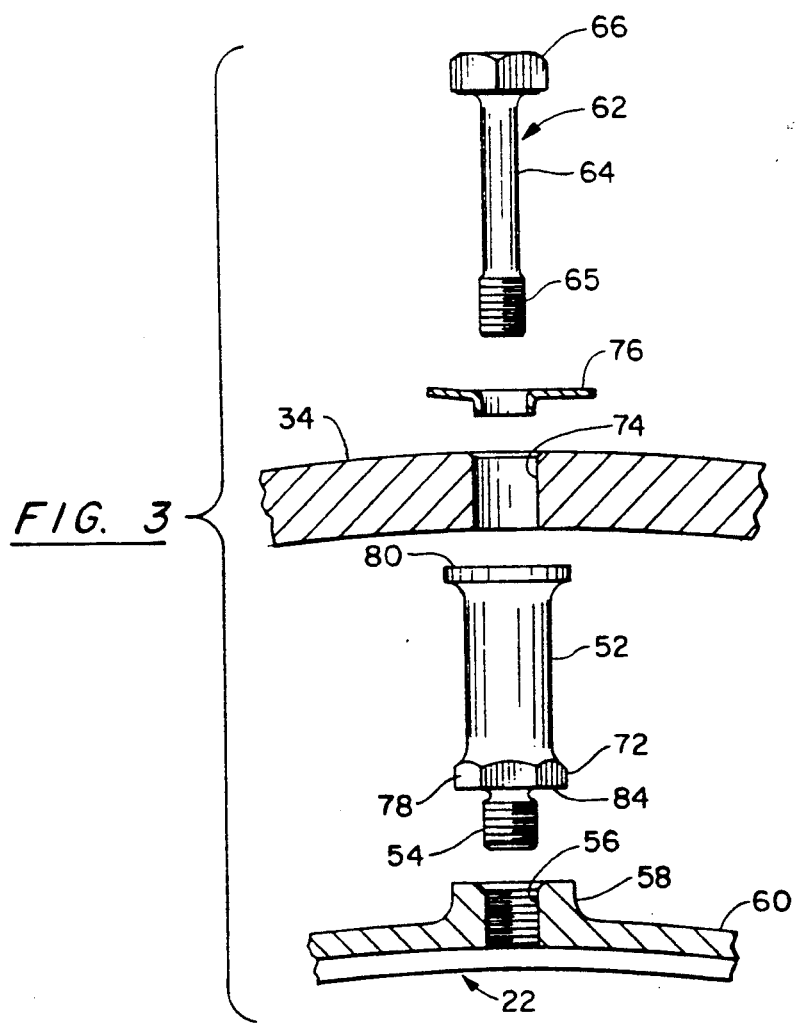
FIG. 3 is an exploded view showing the details of the spool/bolt.

As can best be seen in FIGS. 3 and 4, the spool/bolt arrangement generally illustrated by reference numeral 50 ties the inner case 22 to outer case 34 in such a manner as to enhance fatigue life and provide sufficient strength to withstand the compressor surge problems. Spool/bolt 50 comprises a spool member 52 having a reduced diameter threaded portion 54 at its lower extremity adapted to be threaded onto the complementary internal threads 56 formed in boss 58 extending radially from the outer surface 60 or inner case 22.

The bolt 62 comprises a relatively long shank 64 carrying threads 65 at the lower extremity and a significantly large head 66. Head 66 may be hexagonally shaped and is thicker and has a larger diameter than otherwise would be designed for this particular sized shank. These unusual dimensions of the head allow for a larger fillet radius which serves to reduce the stress concentration and increase fatigue life of the head to shank fillet adjacent the head.

The bolt 62 fits into bore 70 centrally formed in spool 52 that terminates just short of the remote end of the entrance to the bore. The inner diameter of bore 70 is threaded to accommodate the threaded portion of bolt 62. The spool 52 carries a tool receiving portion 72 for threadably securing the spool to inner case 22.

In the assembled condition, the spool 52 is threaded to inner case 22 and the bolt 62 passing through opening 74 in the outer case 34 is threaded to the inner threads of the spool 52, until the head bears against the outer surface of outer case 34 or a suitable washer. Tab washer 76 may be employed to prevent the bolt from inadvertently retracting.

After the spool 52 is torqued sufficiently to urge flange portion 78 to bear against inner case 22, the bolt 62 is sufficiently torqued so that the flange-like portion 80 bears against the surface of outer case 34. The amount of torque will depend on the particular application but it should be sufficient to keep spool 52 in compression throughout the operating range of the engine.

As is apparent from the foregoing, the spool serves as a compressed flange-like member thus reducing both bolt fatigue and surge stresses. This configuration resists fatigue loads occasioned by thermal axial deflection differences between outer case 34 and the segmented inner case 22.

Also apparent from the foregoing and mentioned above is this arrangement resists the radial loads occasioned by a surge when there is an instantaneous and nearly complete loss in compressor flow path pressure.

The spool 52 also makes the threads 54 that mates with the inner case 22 to be insensitive to fatigue loading because it is preloaded by the spool washer face 84 that bears against the inner case.

The thread sizes of threads 65 of bolt 62 and threads 54 of spool 52 are different (the threads 54 are specifically designed to be larger). Because the diameter of the spool threads 54 are larger it has a higher disassembly breakaway torque than bolt 2. Consequently, the bolt 62 will, by design, loosen first.

The bulkhead 38 is a load carry member and is generally annularly shaped forming a relatively straight piece but having a radially extending lower portion 40, an angularly extending middle portion 92 and another radially extending upper portion 42. As mentioned earlier the extremities, i.e. the lower and upper portion 40 and 42 serve basically as flanges and are adapted to be bolted to the inner and upper cases 22 and 34, respectively. The forward face of the lower portion 40 is recessed 101 to accept the radially extending flange 94 integrally formed on the rear end of the inner segmented case 22, forming a somewhat tongue-in-groove arrangement. The inner diameter 96 of bulkhead 38 is dimensioned so that it snugly fits onto the upper surface of the next adjacent stator vane assembly 98 which serves to reduce scrubbing of the case tied assembly, just described.

Of course, it is desirable to minimize the leakage from the gas path into cavity 44 and vice-versa which would otherwise penalize the overall performance of the engine. As described above, the stator vane 30 cast into unitary segments that when mounted end-to-end in the circumferential direction forms three (3) rows of vanes. The stator vane comprises circumferentially spaced airfoil sections 100 and an inner shroud 102 and an outer shroud 104, the outer shroud defining the inner case. As viewed from the perspective drawing of FIG. 2, the three rows of vanes are unitary with the outer shroud 104 and each segment abuts the adjacent segment.

In accordance with this invention a groove 106 adapted to receive "dog-bone" shaped seal 108, i.e., looking at a cross sectional view, extends from the most forward end to the most aft end at the edges of adjacent segments.

The bulbous end 110 and 112 fit into respective adjacent grooves. The bulbous ends 110 and 112 in the preferred embodiment are solid and are fabricated from a suitable metal material capable of withstanding relatively hot temperatures. To prevent wear of the mating surfaces, the bulbous ends 110 and 112 may be coated with aluminum bronze by a well known vapor deposition technique. The width of the seal 108 is determined by the displacement and thermal growth of the stator vanes 30. As depicted in FIGS. 4A, 4B and 4C the dimension is selected to assure that the ends of the bulbous ends 110 and 112 do not press against the inner side walls 118 and 120 when the adjacent edges abut (FIG. 4B) and that the ends do not fall out of the grooves 106 when the adjacent edges are spaced at the maximum axial and distorted distance.

As is exemplified in the sectional end view depicted in FIG. 5, the "dog-bone" shaped scale may also be fabricated so that the central portion of the bulbous end is hollow and in the side view the end is "C" shaped. The "C" portion is compressed when inserted into groove 106 to provide a relatively tight fit.

Although the invention has been shown and described with respect to detailed embodiments thereof, it will be understood by those skilled in the art that various changes in form and detail thereof may be made without departing from the spirit and scope of the claimed invention.

We claim:

1. For a gas turbine engine having a compressor section having a full hoop outer case and segmented circumferential stators supported to said full hoop outer case and defining an inner case, each of said segments of said circumferential stators being disposed in an axial direction relative to each other, said outer case and said inner case defining an annular cavity exposed to the gas path of said engine, the forces of the fluid in said cavity acting on the outer surface of said inner case and the forces of the fluid of said gas path acting on the inner surface of said inner case, the forces acting over the axial extent of said inner case being in one direction at a first axial position and being in a different direction at a second axial position, seal means fitted in grooves formed in the side adjacent edges of said each of said segmented stators, fabricated from a solid metallic material and said bulbous shaped end is coated with an aluminum bronze material, and said seal means having bulbous shaped ends disposed in said grooves and being configured in cross section in a "dog bone" shape, whereby the forces acting on said seal means are in opposite directions at axially spaced locations of said seal means.

2. For a gas turbine engine as claimed in claim 1 wherein said segmented stator includes an outer shroud and a portion of vanes for three stages of said compressor section and defining three full rings of circumferentially spaced vanes when said segmented stators are assembled.

3. For a gas turbine engine as claimed in claim 2 wherein said bulbous shaped ends are fabricated from a solid metallic material.

4. For a gas turbine engine as claimed in claim 3 wherein said bulbous shaped end is coated with an aluminum bronze material.

5. For a gas turbine engine as claimed in claim 2 wherein said seal means is fabricated from a relatively thin sheet metal flat stock and the side edges are bulbous shaped and having a "C" shaped configuration wherein when in the assembled position in said grooves the bulbous ends are forced inwardly to squeeze the "C" of the bulbous shaped side edges.

* * * * *

UNITED STATES PATENT AND TRADEMARK OFFICE
CERTIFICATE OF CORRECTION

PATENT NO. : 5,158,430

DATED : October 27, 1992

INVENTOR(S) : William E. Dixon, et al

It is certified that error appears in the above-identified patent and that said Letters Patent is hereby corrected as shown below:

TITLE PAGE:
In the section entitled "Inventors:", "Lee E. Hensen" should read --Lee E. Hansen--.

Col. 1, line 17, "Typing" should read --Tying--.

Col. 4, line 48, "2" should read --62--.

Signed and Sealed this

Fourteenth Day of December, 1993

Attest:

BRUCE LEHMAN

Attesting Officer

Commissioner of Patents and Trademarks